Patented Aug. 12, 1930

1,772,897

UNITED STATES PATENT OFFICE

PAUL JAEGER, OF STUTTGART, GERMANY

UNDERCOATING FOR ACCELERATING THE TIME OF DRYING OF OIL PAINTS AND ENAMELS

No Drawing. Application filed June 29, 1926, Serial No. 119,473, and in Germany March 23, 1926.

In order to accelerate the drying of oil paints and enamels drying agents have hitherto been added to the paint when ready for use. Owing to the drying action natural and peculiar to all the vegetable oils and which is due to oxidation, it has however only been possible to accelerate the drying action hereby to a limited extent. It even not infrequently happens that in consequence of the addition of too large a percentage of dryer to oil paints exactly the opposite results and the action becomes reversed, i. e., too great an admixture of drying agent prolongs the drying process and sometimes even renders the coats of paint permanently sticky.

Old hardened undercoating of oil paint also unfavorably affects the time of drying of oil paint or enamels particularly when the old coat of oil paint is very porous and therefore absorbs much oil from the next coat applied over it, which then takes a very long time to harden in the pores or when the old coat itself was not free from stickiness when the next coat of paint was applied.

The drying of coats of paint is therefore always more or less dependent on the undercoating.

According to the present invention an undercoating of a new composition is to be used on the old coat of paint and before the new coat is applied, which composition is of such a nature that its constituents, when the undercoating is dry, assist in the hardening of the coats of paint applied over it.

As will be seen from the above remarks such an undercoating must not contain any vegetable oils, that is to say oxidizable oils, but must consist of neutral constituents such for example as nitrocellulose and must have some substance added to it which has a drying or hardening action on vegetable oils. As such added substances may be mentioned all metallic compounds of oleic acid which have already been used as drying agents for oils and paints in a liquid or dissolved form. If for example a grounding preparation consisting of nitrocellulose and resin as filling materials has added to it such a drying agent the grounding layer which remains behind has a hardening action on the next coat of oil paint applied owing to the fact that this neutral layer of resin and cellulose which is not subject to oxidation contains the corresponding metallic oxides in a state of extremely fine sub-division. In this way these oxides act in an entirely different manner on the coat of oil or paint applied over it from the way in which they would act were they added to this paint in a liquid or dissolved state, because even an excess acts as a hardening agent when the above method is used whereas if added to the paint the excess would directly hinder the hardening. Even the addition of a small percentage of the dryers to a liquid grounding mixture of this kind suffices to produce a readily appreciable result. As the well known oil-free cellulose grounding agents contain at the most from 10 to 15 per cent of solid constituents which remain behind after evaporation of the solvents, even a slight addition to the grounding liquid constitutes in the film left behind by the grounding agents a multiple of the percentage added to the liquid.

For instance a grounding agent which has added to it in a liquid state from 1 to 1½ per cent of drying substances yields a film in which about 10 per cent of these drying substances will be contained. If therefore a coat of oil paint be applied to a film produced by such a grounding medium, the finely divided drying material acts quite differently on the coat of oil paint because it dries from the bottom outwards and does not, as has very frequently been the case heretofore, remain sticky at the bottom, while the coat is already dry on top. The result is a much more thorough drying, and subsequent re-softening or residual stickiness at high temperatures is thereby effectively prevented.

As experiments have proven this more rapid drying out has also combined with it the special advantage that where a grounding coat according to the present invention is applied to insulating coats such as tar or the like before a coat of oil paint or enamel is applied to the latter, the danger of permeation and discoloring of the finished coats by the insulating coat is very greatly lessened. Whereas hitherto oil paints applied directly over insulating paints would often be permeated and discolored even after a long drying time, practical tests have shown that this tendency is lessened with the increase in the amount of drying agents added to the material forming the grounding coat, and is lessened with the rapidity of the hardening of the subsequently applied oil paint or enamel.

This phenomenon is easily explained by the fact that the danger of permeation only exists so long as the oil paint is still in a liquid state. The danger of permeation is therefore lessened or entirely eliminated with the rapid hardening of the oil paint from underneath so that the insulating property of the entire coating is increased.

Also if in case of painted surfaces, which require a number of coats of paint, a grounding medium according to the present invention is applied as an intermediate coat to each previously applied coat of oil paint after the latter is dry, the same action takes place on the next coat of paint and in this way an extremely rapid drying of all coats of paint results and thus the time for finishing the entire work can be materially shortened.

By the aid of a grounding medium of this kind the hardening of single coats can be so accelerated that when standard oil paints are used it will take place in a few hours. Where a number of coats are applied the painting can be carried out in a fraction of the time hitherto required for such work.

I claim:—

An oil-free ground coating for oil paints or the like containing in solution nitrocellulose and resin as fillers and a drying agent, which latter remains in finely divided form and in a fully active condition in the fillers after the solvent has evaporated and ready to react upon the subsequently applied coat of oil paint to accelerate the hardening of said coat.

In testimony whereof I affix my signature.

PAUL JAEGER.